US006976781B2

(12) United States Patent
Chu et al.

(10) Patent No.: US 6,976,781 B2
(45) Date of Patent: Dec. 20, 2005

(54) FRAME AND BEZEL STRUCTURE FOR BACKLIGHT UNIT

(75) Inventors: Chi-Chih Chu, Yung Ho (TW); Wen-Yuan Cheng, Taoyuan Hsien (TW); Hui-Kai Chou, Taipei (TW)

(73) Assignee: AU Optronics Corp., Hsinchu (TW)

( * ) Notice: Subject to any disclaimer, the term of this patent is extended or adjusted under 35 U.S.C. 154(b) by 31 days.

(21) Appl. No.: 10/446,103

(22) Filed: May 28, 2003

(65) Prior Publication Data

US 2004/0080952 A1    Apr. 29, 2004

(30) Foreign Application Priority Data

Oct. 25, 2002    (TW) ................................ 91125324 A

(51) Int. Cl.[7] ............................................... F21V 7/04
(52) U.S. Cl. ........................... 362/633; 349/58; 40/209; 40/781
(58) Field of Search ............................ 362/23, 26, 28, 362/31, 551, 559, 560, 561, 362, 367, 368, 362/374, 382, 396, 433, 444, 600, 632, 633, 362/634; 349/58, 60, 56; 385/129; 40/204, 40/209, 124.02, 661.02, 541, 549, 700, 714, 40/781

(56) References Cited

U.S. PATENT DOCUMENTS

| | | | |
|---|---|---|---|
| 5,570,267 A * | 10/1996 | Ma ............................. | 361/681 |
| 6,170,956 B1 * | 1/2001 | Rumsey et al. ............. | 359/839 |
| 6,386,722 B2 * | 5/2002 | Okumura ..................... | 362/31 |
| 6,502,945 B2 * | 1/2003 | Kim et al. .................... | 362/27 |
| 6,507,377 B1 * | 1/2003 | Jung ........................... | 349/60 |
| 6,507,484 B2 * | 1/2003 | Fukuyoshi .................. | 361/681 |
| 6,762,806 B1 * | 7/2004 | Matsuo et al. ............... | 349/58 |

\* cited by examiner

*Primary Examiner*—Thomas M. Sember
*Assistant Examiner*—Ismael Negron
(74) *Attorney, Agent, or Firm*—Troxell Law Office, PLLC

(57) ABSTRACT

A frame including a first edge and a second edge, wherein on outer surfaces of the first edge, first hooks are formed to protrude outwardly, and on outer surfaces of the second edge, first holes are formed. A bezel has a first sidewall and a second sidewall, wherein on the first sidewall, second holes are formed, and on outer surfaces of the second sidewall, second hooks are formed to protrude outwardly. When the frame is mounted onto the bezel, the first edge is disposed onto inside surfaces of the first sidewall, and the first hooks are inserted and engaged in the second holes for fastening the frame and bezel, simultaneously the second edge is disposed onto the outside surfaces of the second sidewall, and the second hooks are inserted and engaged in the first holes for fastening the frame and the bezel.

13 Claims, 5 Drawing Sheets

FRAME AND BEZEL STRUCTURE FOR BACKLIGHT UNIT

FIELD OF THE INVENTION

The present invention relates to a backlight unit of a liquid crystal display, and more specifically, to a new assembling manner for mounting a frame onto a bezel to provide the assembling structure the reinforced supporting strength and to provide the convenience of disassembling the frame from the bezel.

BACKGROUND OF THE INVENTION

With the advance of techniques for manufacturing thin-film transistors, the liquid crystal displays (LCD) are widely applied in electrical products, such as PDAs, laptops, digital cameras, cell phones, high resolution television sets, etc. due to advantages as portability, non-radiation and saving electricity. Especially when the manufactures devote themselves to further research and improve the materials, processes and equipments for producing LCD devices, the qualities of the LCDs are promoted and prime costs are reduced substantially. It is required to introduce backlight units into the LCDs for illumination because the liquid crystal molecules are non-illumination materials. Therefore the backlight unit is the most importance element for manufacturing the LCD devices, and the performance thereof is closely related to the displaying effect of the LCD.

Refer to FIG. 1, the typical backlight unit 10 applied to the LCDs comprises a lightguide plate 100, optical films 102, a reflector sheet 104, a tubular lamp 106, a frame 108 and a backbezel 110. The frame 108 and the bezel 110 are assembled together to contain and fabricate above components. When the backlight unit 10 is assembled, the reflector sheet 104 is disposed on the bezel 110, and then the lightguide plate 100 and the optical films 102 are disposed in sequence on the reflector sheet 104. Next, the frame 108 is mounted and fastened onto the bezel 110. And the tubular lamp 106 is inserted into the backlight unit 10 through an opening at the corner of the frame 108. The tubular lamp 106 is inserted into the slot between the lightguide plate 100 and one edge of bezel 110.

It is noted that for the purpose of fastening the frame 108 onto the bezel 110 as shown in FIG. 1, some hooks 110a are formed to protrude outwardly from the outside of the sidewalls of the bezel 110, and correspondingly on the sidewalls of the frame 108 some holes 108a are formed. Thus, when the frame 108 is mounted on the bezel 110, the hooks 110a of the bezel 110 are inserted and engaged in the holes 108a of the frame 108 for fastening the frame 108 and the bezel 110. Please refer to FIG. 2, the assembling structure of the frame 108 and the bezel 110 is illustrated.

Except the aforementioned assembling manner, in some backlight unit, as shown in FIG. 3, on the sidewalls of the bezel 111 are formed some holes 111b, and correspondingly on edges of the frame 109 some hooks 109b are fabricated. Therefore, when the frame 109 is disposed onto the bezel 111, the outside surfaces of the edges of the frame 109 are enclosed and attached by the inside surfaces of the sidewalls of the bezel 111, and the hooks 109b of the frame 109 are inserted and engaged in the respective holes 111b of the bezel 111 for fastening the frame 108 and the bezel 111.

In general, when the assembling manner shown in FIG. 2 is introduced, the edges of the frame 108 are mounted on the outside of the sidewalls of the bezel 110. It is noted that because the frame 108 made of resin material is flexible and elastic, the operator can disassemble the frame 108 from the bezel 110 easily just by pressing back slightly the hooks 110a of the bezel 110 and simultaneously pulling the edges of the frame 108. Even though such assembling manner has the advantage of easy disassembling, however, the structure strength of the backlight unit is worse due to the resin frame 108 is pliable.

Besides, when the assembling manner shown in FIG. 3 is used, the edges of the frame 109 are enclosed and attached by the inside surfaces of the sidewalls of the bezel 111. Because the edge of the frame 109 is wedged between the bezel 111 and the lightguide plate 100, the structure strength of such backlight unit is reinforced. However, due to the bezel 111 made of metal material is too hard, it is difficult to disassemble the frame 109 from the bezel 111. The operators have to exert themselves to reject the hooks back and extract the frame 109 from the bezel 111. Apparently, such assembling design will increase the degree of difficulty in reassembling procedures. Under these conditions, the manufacturers usually have to trade off between structure strength and disassembling convenience. And apparently there is a requirement to figure out a new mounting manner for obtaining above two advantages both.

SUMMARY OF THE INVENTION

The prime objective of the present invention is to provide a new assembling manner of the backlight unit for obtaining the both advantages of disassembling convenience and increasing structure strength.

The present invention discloses an assembling structure of a backlight module. The assembling structure comprises following components. A rectangular frame has a long edge and a short edge, wherein first hooks are formed and protruding outwardly on outside surfaces of said long edge, and first holes are formed on said short edge. A rectangular bezel has a long sidewall and a short sidewall, wherein second holes are formed on said long sidewall and second hooks are formed and protruding outwardly on outside surfaces of said short sidewall. When said rectangular frame is mounted onto said rectangular bezel, said long edge is attached to inside surfaces of said long sidewall and said first hooks are inserted and engaged in said second holes for fastening said rectangular frame and said rectangular bezel, and simultaneously said short edge is attached to said outside surfaces of said short sidewall and said second hooks are inserted and engaged in said first holes for fastening said rectangular frame and said rectangular bezel.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
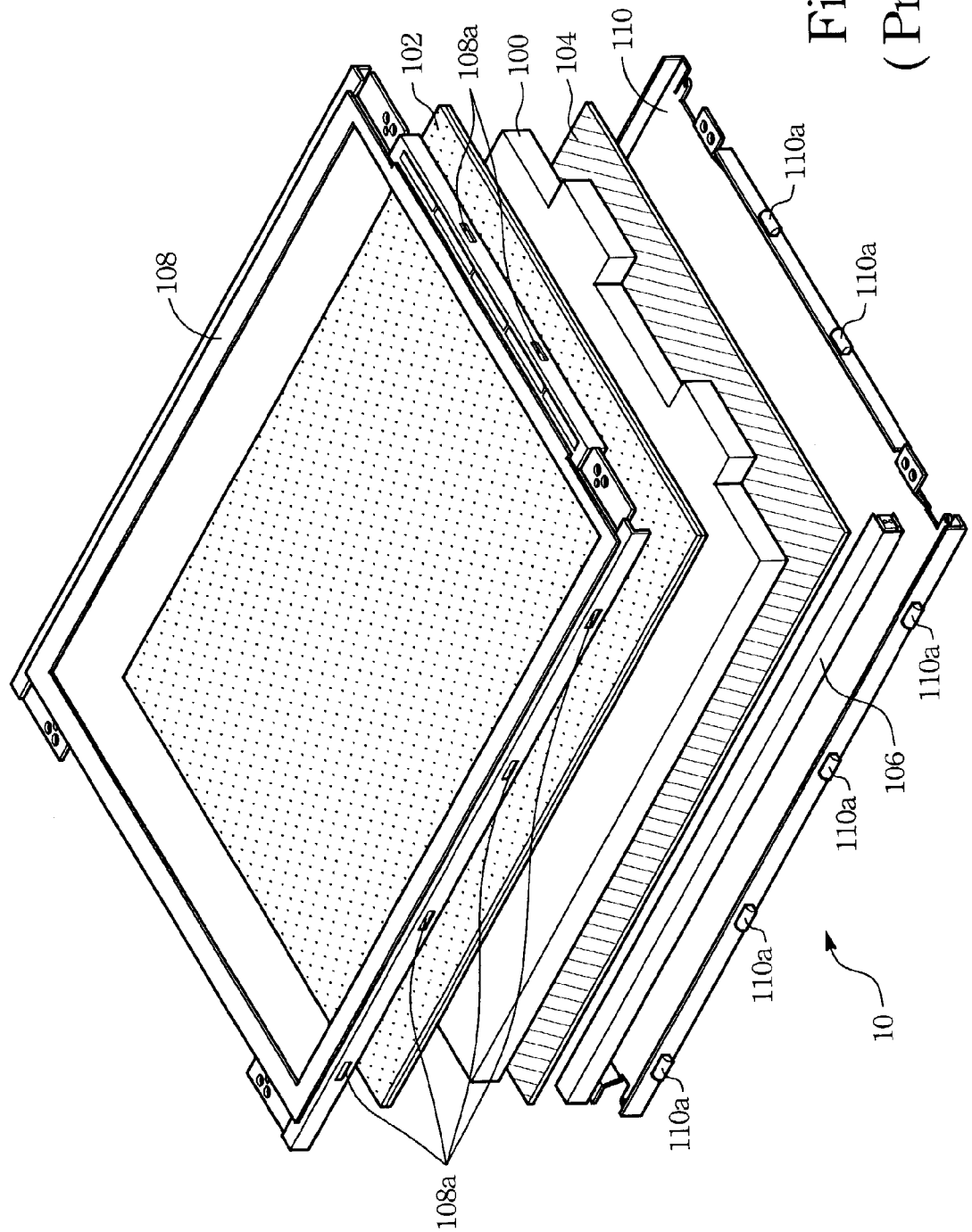
FIG. 1 illustrates the assembling manner of the components of the backlight unit.
Figure 2:
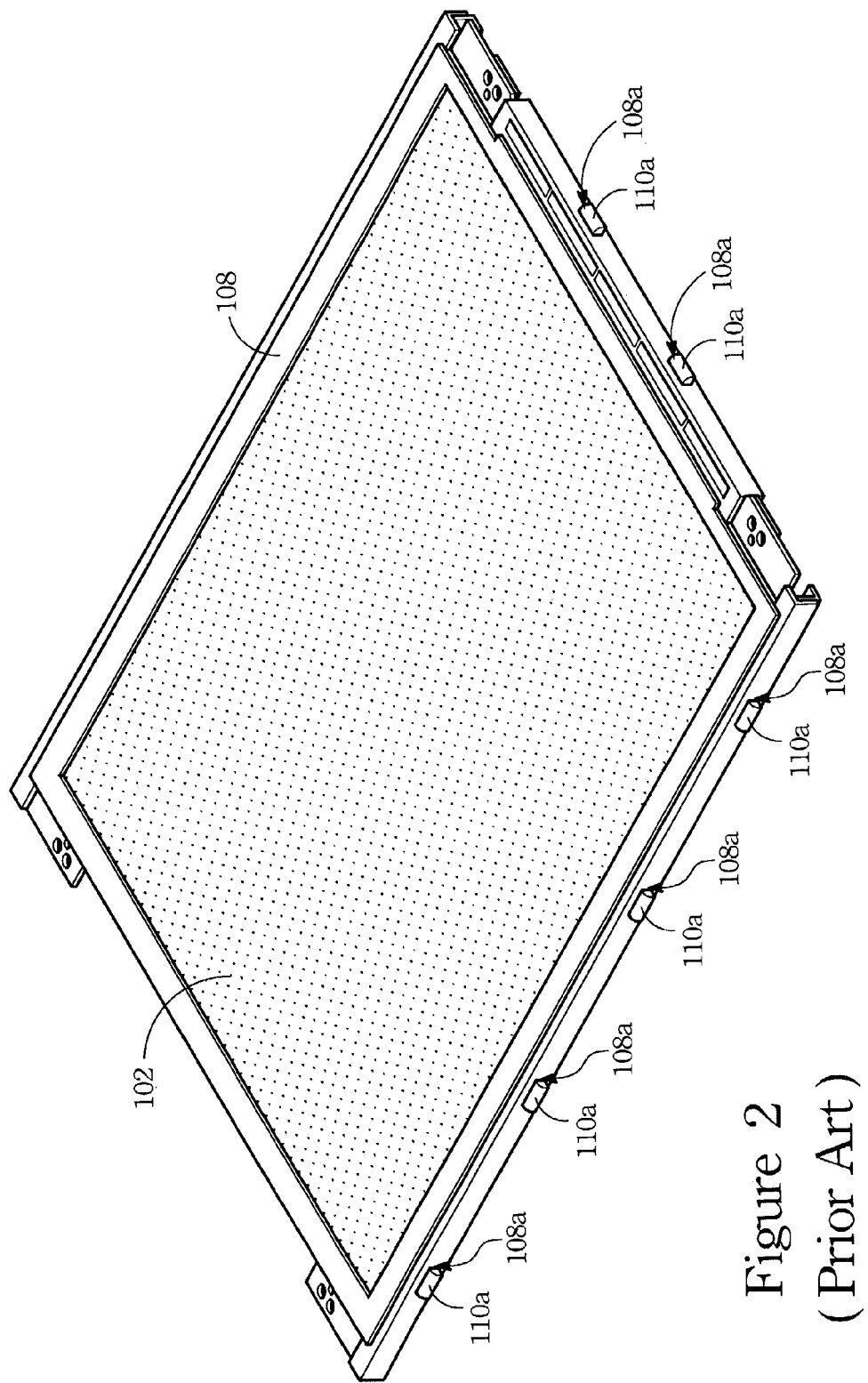
FIGS. 2 & 3 illustrates the conventional assembling manner of the backlight unit.
Figure 3:
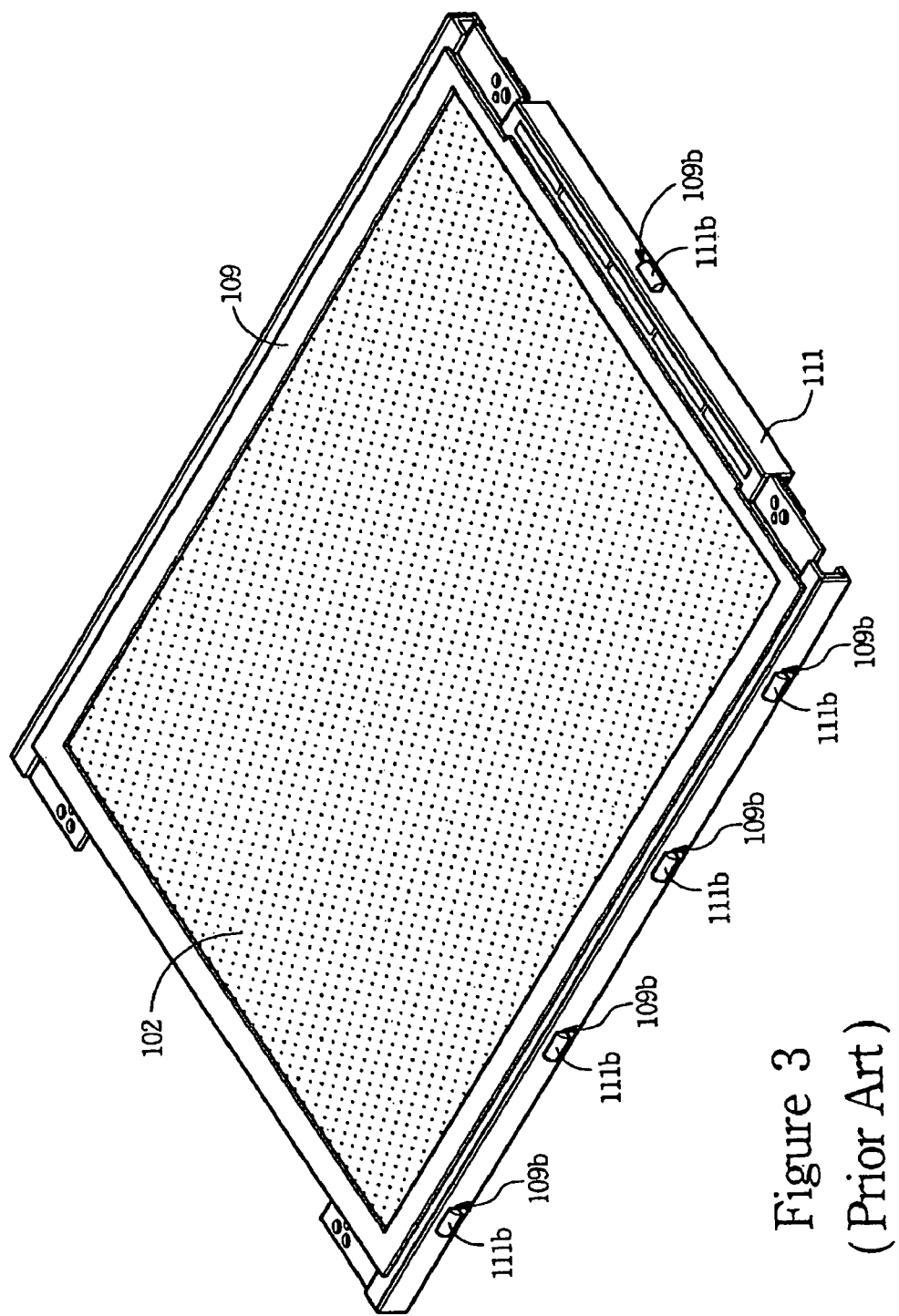

As aforementioned, the assembling structure 20 is introduced to contain and fabricate various components of the backlight unit, such as a lightguide plate 302, optical films 300, a reflector sheet 304, a tubular lamp 306 and etc. The assembling structure 20 comprises a frame 200 and a bezel 210. The frame 200 has a rectangular shape composed of two long edges 202 and two short edges 204. On each long edge 202 a plurality of holes 206 are formed. And on outer surfaces of each short edge 204 a plurality of hooks 208 are fabricated.

Correspondingly, the bezel 210 also has a rectangular shape. As shown in the FIGURE, the bezel 210 has a rectangular board 212, two long sidewalls 214 and two short sidewalls 216 which are erect from the edges of the rectangular board 212 respectively. On outer surfaces of each long sidewall 214 a plurality of hooks 218 are formed and protruding outwardly. And on each short sidewall 216 a plurality of holes 220 are formed.

Figure 4:
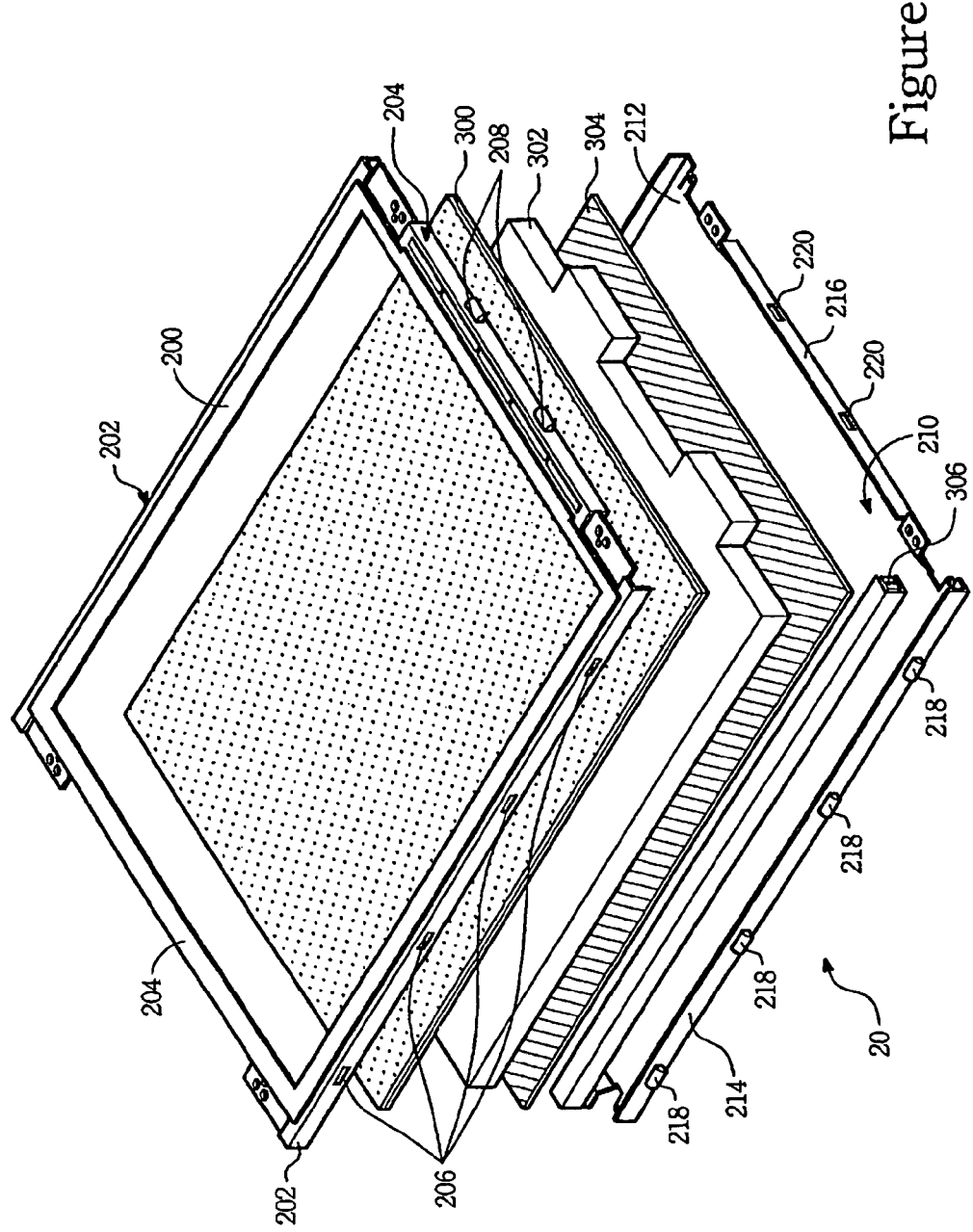
FIG. 4 illustrates the frame and the bezel fabricated according to the present invention.
Figure 5:
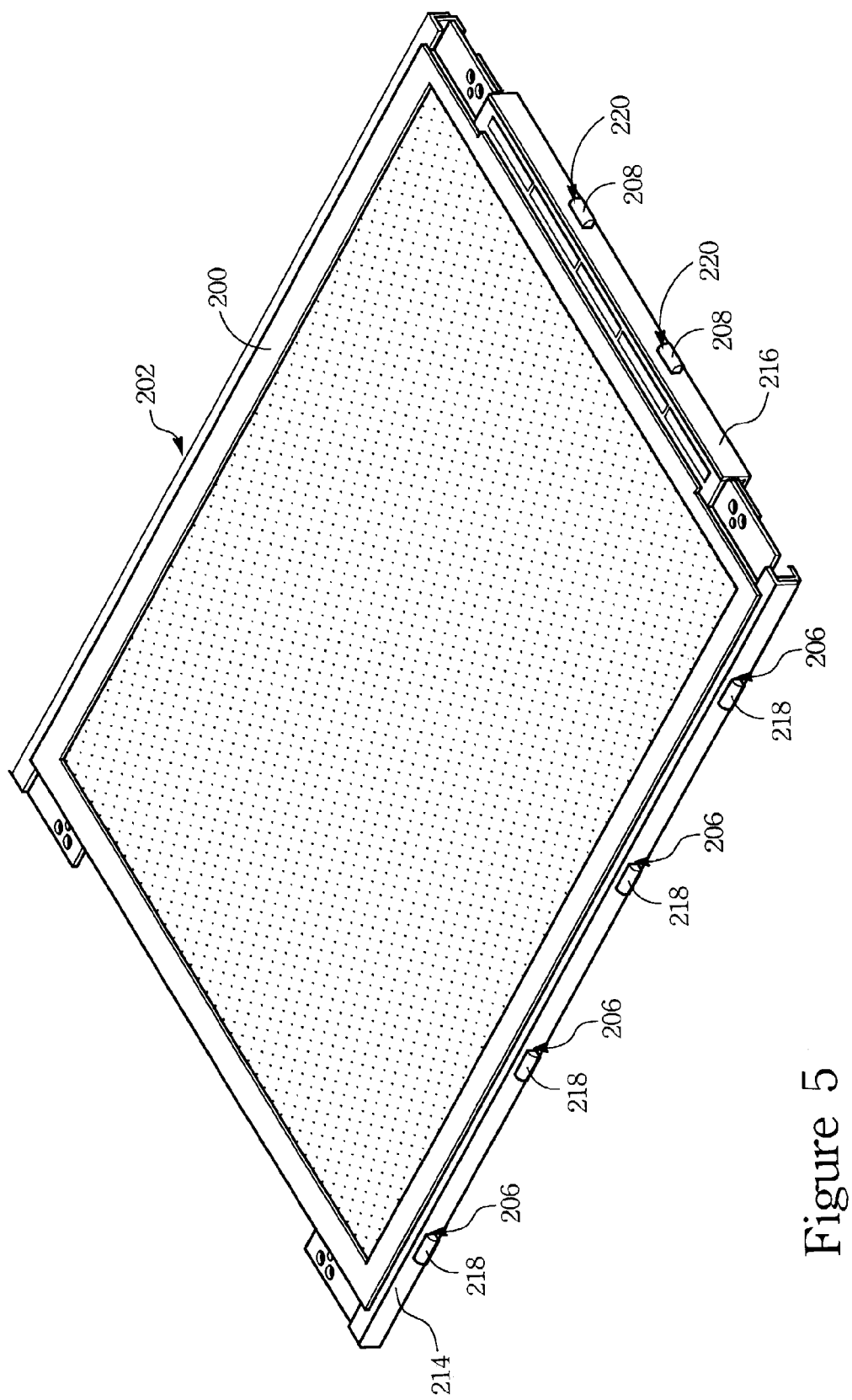
FIG. 5 illustrates the mounting manner of the frame and the bezel according to the present invention.

As aforementioned, when the components of the backlight unit are assembled, the reflector sheet 304, the lightguide plate 302 and optical films 300 are disposed in sequence onto the rectangular board 212 of the bezel 210. As shown in FIG. 4, the reflector sheet 304 is disposed on the rectangular board 212 of the bezel 210, the lightguide plate 302 is disposed on the reflector sheet 304, and the optical films 300 are disposed on the lightguide plate 302. Then, the frame 200 is mounted onto the bezel 210 to contain those components. The long edges 202 of the frame 200 are disposed and attached onto the outside surfaces of the long sidewalls 214 of the bezel 210. Namely, the long sidewall 214 is covered by the edge 202. And the hooks 218 on the outer surfaces of the long sidewall 214 are inserted and engaged in the holes 206 of the long edge 202 to fasten the frame 200 onto the bezel 210. In the mean time, the short edge 204 is disposed and attached onto the inside surfaces of the short sidewall 216 of the bezel 210, and the hooks 208 on the outside surfaces of the short edge 204 are inserted and engaged in the holes 220 of the short sidewall 216 to fasten the frame 200 and the bezel 210, as shown in FIG. 5.

It is noted that in most applications of the backlight module the frame 200 is made of flexible materials such as resin, and the bezel 210 is made of metal materials such as aluminum. Therefore, the short sidewalls 216 of the bezel 210 covering the outside of the short edge 200 of the short sidewall 216 can reinforce the structure strength of the backlight unit. AT the same time, because the long edges 202 of the frame 200 are attached to the outside of the long sidewalls 214 of the bezel 210, the frame 200 can be disassembled from the bezel 210 very easily by pressing slightly the hooks 218 of the bezel 210 and pulling the long edges 202 of the frame 200.

it is noted that in the above embodiment, the long edges 202 of the frame 200 are formed with the holes 206, and the short edges 204 are formed with hooks 218. However, in another embodiment, other mounting manners can be chosen according to the requirements of designing backlight units. For example, the short edges of the frame can be defined with holes, and the long edges of the frame can be fabricated with protruding hooks. Correspondingly, the short sidewalls of the bezel are fabricated with hooks and the long sidewalls thereof are drilled to have holes thereon. Thus, the assembling structure with the frame mounted onto the bezel can have both the advantages of enhancing structure strength and easy disassembling.

Besides, in a further embodiment, only one edge of the rectangular frame is fabricated with holes and the others (the three edges) are fabricated with protruding hooks. Certainly, in this design, only one sidewall of the bezel is fabricated with hooks, and the others are fabricated with holes for fastening the frame and the bezel.

It is noted that in most backlight units the tubular lamp of the backlight unit is disposed on the inside of one long sidewall of the bezel. So in a preferred embodiment the long edges of the frame are disposed to attach the outside surfaces of the long sidewalls of the bezel. Therefore, the long sidewall of the bezel is more closely to the tubular lamp and can have efficient heat dissipations due to the metal material of the bezel. And that can prevent the overheat issues of the tubular lamp in the prior art. In other words, the long sidewall adjacent to the tubular lamp is fabricated with hooks that are protruding outwardly from the outside surfaces of the long sidewall. And on the corresponding long edges of the frame the holes are formed for receiving and wedging the hooks of the bezel, in order to fasten the frame and the bezel and to let the sidewall of the metal bezel more closely to the tubular lamp.

Except the design of assembling the frame and the bezel as illustrated in the above embodiment, the fastening manner can also be applied to the assembling structure of two frames. For example, some first hooks are fabricated on the outside of the first edge of an upper frame, and on the second edges of the upper frame some first holes are formed. In the mean time, on the third edges of a lower frame some second holes are formed to receive and wedge the first hooks, and outside the fourth edges of the lower frame some second hooks are fabricated to insert and engage the first holes for fastening the upper and lower frames.

The assembling structures provided in the present invention have many advantages. Because the two long edges of the frame are disposed to mount and cover the two long sidewalls of the bezel, and the two short edges of the frame are disposed inside the two short sidewalls of the bezel. So the assembling structures can obtain both the reinforced structure strengths and the disassembling convenience.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and similar design.

What is claimed is:

1. An assembling structure of a backlight module for containing and fabricating components of said backlight module, said assembling structure comprising:
    a frame, having a first edge and a second edge, wherein on outer surfaces of said first edge a plurality of first hooks are formed to protrude outwardly, and on outer surfaces of said second edge a plurality of first holes are formed;
    a bezel, made of metal material, having a first sidewall and a second sidewall, wherein on said first sidewall a plurality of second holes are formed, and on outer surfaces of said second sidewall a plurality of second hooks are formed to protrude outwardly;
    wherein said first edge is disposed onto inside surfaces of said first sidewall, said first hooks are inserted and engaged in said second holes, said second edge is disposed onto outside surfaces of said second sidewall, and said second hooks are inserted and engaged in said first holes as said frame is mounted onto said bezel.

2. The assembling structure of claim 1, wherein said frame is made of resin material.

3. The assembling structure of claim 1, wherein a tubular lamp of said backlight module is disposed inside and adjacent to said second sidewall of said bezel.

4. The assembling structure of claim 1, wherein said frame has a rectangular shape, and said first edge of said frame is a short edge, and said second edge of said frame is a long edge.

5. The assembling structure of claim 1, wherein said bezel has a rectangular board, and said first sidewall and said second sidewall are erect from edges of said rectangular board, said first sidewall is a short sidewall of said bezel and said second sidewall is a long sidewall thereof.

6. An assembling structure of a backlight module for containing and assembling components of said backlight module, said assembling structure comprising:
   an upper frame, made of resin material, having a first edge and a second edge, wherein on outside surfaces of said first edge first hooks are formed to protrude outwardly, and on said second edge first holes are formed; and
   a lower frame, made of metal material, having a third edge and a fourth edge, wherein on said third edge second holes are formed, and on outside surfaces of said forth edge second hooks are formed to protrude outwardly;
   wherein said first edge is disposed inside said third edge and said first hooks are inserted and engaged in said second holes, said second edge is attached to the outside surfaces of said fourth edge, and said second hooks are inserted and engaged in said first holes as the upper frame is mounted onto the lower frame.

7. The assembling structure of claim 6, wherein a tubular lamp of said backlight module is disposed inside said fourth edge of said lower frame.

8. A backlight unit comprising:
   a bezel made of metal material, having a first sidewall and a second sidewall, wherein on said first sidewall a plurality of first holes are formed, and on outer surfaces of said second sidewall a plurality of first hooks are formed to protrude outwardly;
   a lightguide plate, disposed above said bezel;
   a frame, disposed above said lightguide plate and mounted onto said bezel, having a first edge and a second edge, wherein on outer surfaces of said first edge a plurality of second hooks are formed to protrude outwardly, and on outer surfaces of said second edge a plurality of second holes are formed, wherein said first edge is disposed onto inside surfaces of said first sidewall, and said second hooks are inserted and engaged in said first holes for fastening said frame and said bezel, simultaneously said second edge is disposed onto outside surfaces of said second sidewall, and said first hooks are inserted and engaged in said second holes for fastening said frame and said bezel; and
   a tubular lamp, disposed on said bezel, beside said lightguide plate, and adjacent to inside surfaces of said second sidewall of said bezel.

9. The backlight unit of claim 8, wherein said frame is made of resin material.

10. The backlight unit of claim 8, further comprising a reflector sheet, disposed on said bezel and beneath said lightguide plate.

11. The backlight unit of claim 8, further comprising optical films, disposed on said lightguide plate and under said frame.

12. The backlight unit of claim 8, wherein said frame has a rectangular shape, and said first edge of said frame is a short edge, and said second edge of said frame is a long edge.

13. The backlight unit of claim 12, wherein said bezel has a rectangular board, and said first sidewall and said second sidewall are erect from edges of said rectangular board, said first sidewall is a short sidewall of said bezel and said second sidewall is a long sidewall thereof.

* * * * *